United States Patent [19]

Griffith et al.

[11] Patent Number: 4,603,388
[45] Date of Patent: Jul. 29, 1986

[54] VTOL ALTITUDE HOLD SYSTEM WITH AUTOMATIC GROUND EFFECT COMPENSATION

[75] Inventors: Carl D. Griffith, Phoenix; Edmund R. Skutecki, Glendale, both of Ariz.

[73] Assignee: Sperry Corporation, New York, N.Y.

[21] Appl. No.: 466,816

[22] Filed: Feb. 16, 1983

[51] Int. Cl.4 .................. G06F 15/50; G06G 7/78
[52] U.S. Cl. ......................... 364/433; 244/17.13; 244/180
[58] Field of Search ............... 364/427, 428, 433, 434, 364/424, 571; 244/17.13, 223, 180–182; 318/584; 73/178 R, 178 H, 178 T; 340/967, 970

[56] References Cited

U.S. PATENT DOCUMENTS

| | | | |
|---|---|---|---|
| 3,250,121 | 5/1966 | Schwartz | 244/17.13 |
| 3,800,127 | 3/1974 | Knemeyer et al. | 364/433 |
| 4,005,835 | 2/1977 | Gerstine et al. | 364/432 |
| 4,345,195 | 8/1982 | Griffith et al. | 244/223 |

*Primary Examiner*—Gary Chin
*Attorney, Agent, or Firm*—Howard P. Terry

[57] ABSTRACT

During a transition of a VTOL aircraft such as a helicopter, from one altitude held without its ground effect zone to another to be held within its ground effect zone, or vice versa, a collective stick position synchronizer which can memorize the proper trim condition at the previous altitude in conjunction with the stick force sensor out-of-detent logic and a low vertical speed sensor, together constituting a ground effect zone detector, is used to drive the collective stick trim actuator in a direction which relieves any force being exerted by the pilot in order to maintain the new commanded altitude.

10 Claims, 4 Drawing Figures

VTOL ALTITUDE HOLD SYSTEM WITH AUTOMATIC GROUND EFFECT COMPENSATION

BACKGROUND OF THE INVENTION

1. Field of the Invention

This invention relates to automatic radar altitude control of aircraft having vertical take-off and landing capabilities such as helicopters, and more particularly to automatic ground effect compensation to maintain altitude control of such craft subject to ground effect.

2. Description of the Prior Art

Ground effect can generally be defined as the reaction on the craft due to the downwash of air from the rotating blades striking the ground and then reflected back from the ground to the craft tending to increase air density and hence rotor lift as the craft enters the ground effect zone. The ground effect zone can be generally defined as a zone or volume having a diameter and height equal to the diameter of the rotor blades.

As the craft leaves the ground effect zone the ground effect decreases the lift capability of the sustaining rotor. Such a change in lift will normally be reflected in an increase in the power required to maintain the craft in a hover and/or altitude hold condition.

In existing helicopters having automatic radar altitude hold capability, the pilot may select through a conventional mode select panel or through manual override of the altitude hold, an altitude at which it is desirable to hover; for example, during a rescue mission. The autopilot through a servo amplifier drives a parallel trim actuator which is connected to the pilot's collective control stick through a preloaded force feel spring. Included also in the trim servo system is a clutch means, integral with the trim actuator, which allows the actuator control arm to be declutched from the servomotor. Also included is a detent switch operable by force spring and a collective control stick position sensor. A full disclosure and description of a typical helicopter trim actuator system useful in carrying out the present invention may be had by reference to U.S. Pat. No. 4,345,195 also assigned to the present assignee.

As is well known to those skilled in the art, by manipulation of the collective control stick against the force feel spring, the craft may be manually flown to the desired altitude and upon release of the collective control stick force, the autopilot will maintain the desired altitude. Typically, the desired altitude is a low altitude sensed by a radar altimeter. However, prior art radar altitude hold systems do not have the capability to automatically compensate for the change in lift effects encountered when the pilot maneuvers the craft into or out of the transition area at the upper limit of the ground effect zone. Without this capability, the pilot is required to exert a steady state force on the collective control stick to increase blade bite and a corresponding increase in engine power. If he releases the force, the stick will initially move toward its original trim position, thereby creating an undesirable transient in the aircraft's altitude due to the ground effect lift. To overcome this problem, some prior art systems provide a pilot operated collective force trim release switch on the collective control stick. With the addition of the trim release switch, as the craft enters the ground effect transition zone, for example, the pilot is required to depress the trim release switch in order to alleviate the force he is exerting upon the collective control stick. This results, however, in an abrupt discontinuity in the force feel characteristics of the system, and an unpleasant vertical jolt to the aircraft and its passengers.

SUMMARY OF THE INVENTION

To overcome the foregoing control problems, the present invention provides a system for automatically compensating for the effects of ground effect on the vehicle. In general, there is provided a vertical speed comparator and a collective stick position synchronizer. The vertical speed comparator senses the actual vertical speed of the craft against a predetermined minimum vertical speed. If the actual vertical speed is not above the preselected minimum vertical speed and the collective control has been moved out of a previously established trim condition, a permanent change of the previously selected trim condition is required. Under these logical conditions, a signal is generated to enable the servo amplifier of the autopilot system thereby permitting the collective position synchronizer to provide the servo amplifier with a signal which will drive the trim actuator in a sense to relieve the force being exerted on the trim actuator system by the pilot through the collective control eventually closing the detent switch and enabling the selected altitude to be held automatically by the radar altitude control system in a conventional fashion.

DESCRIPTION OF THE PREFERRED EMBODIMENT

Figure 1A:
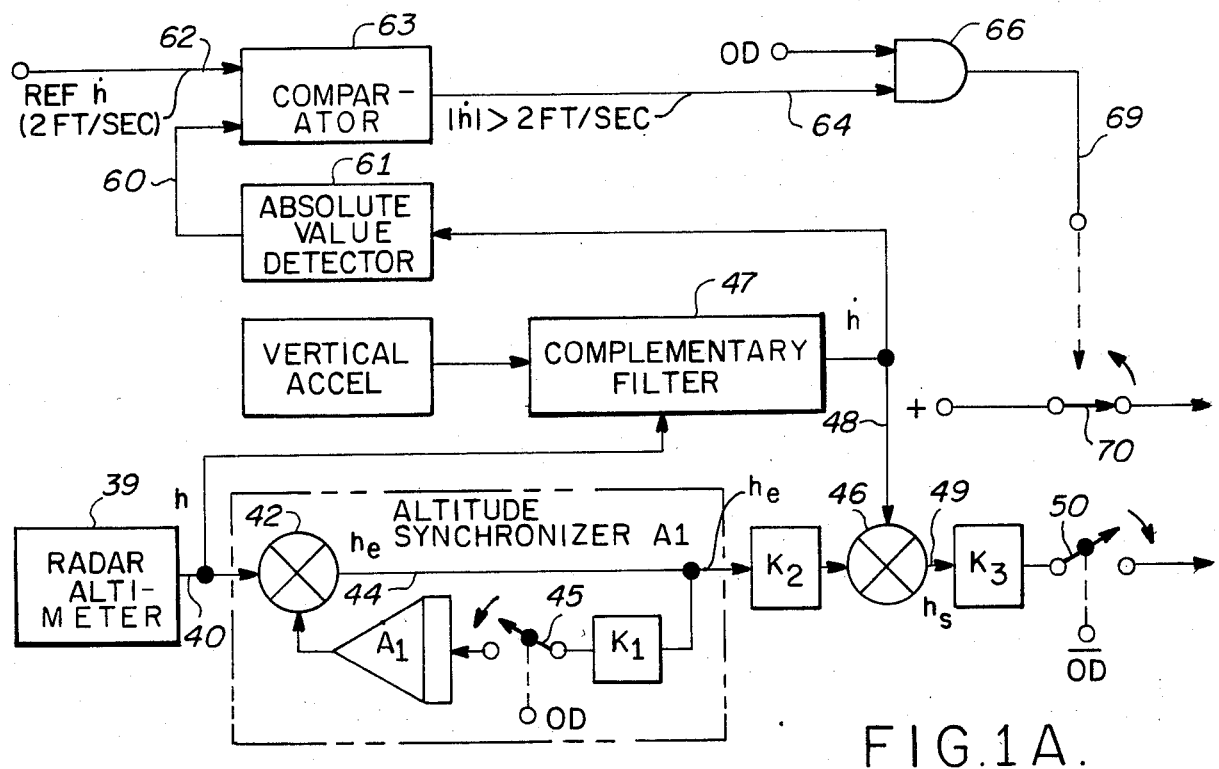
FIGS. 1A and 1B are schematic illustrations of the automatic ground effect compensation control system of the present invention.
Figure 1B:
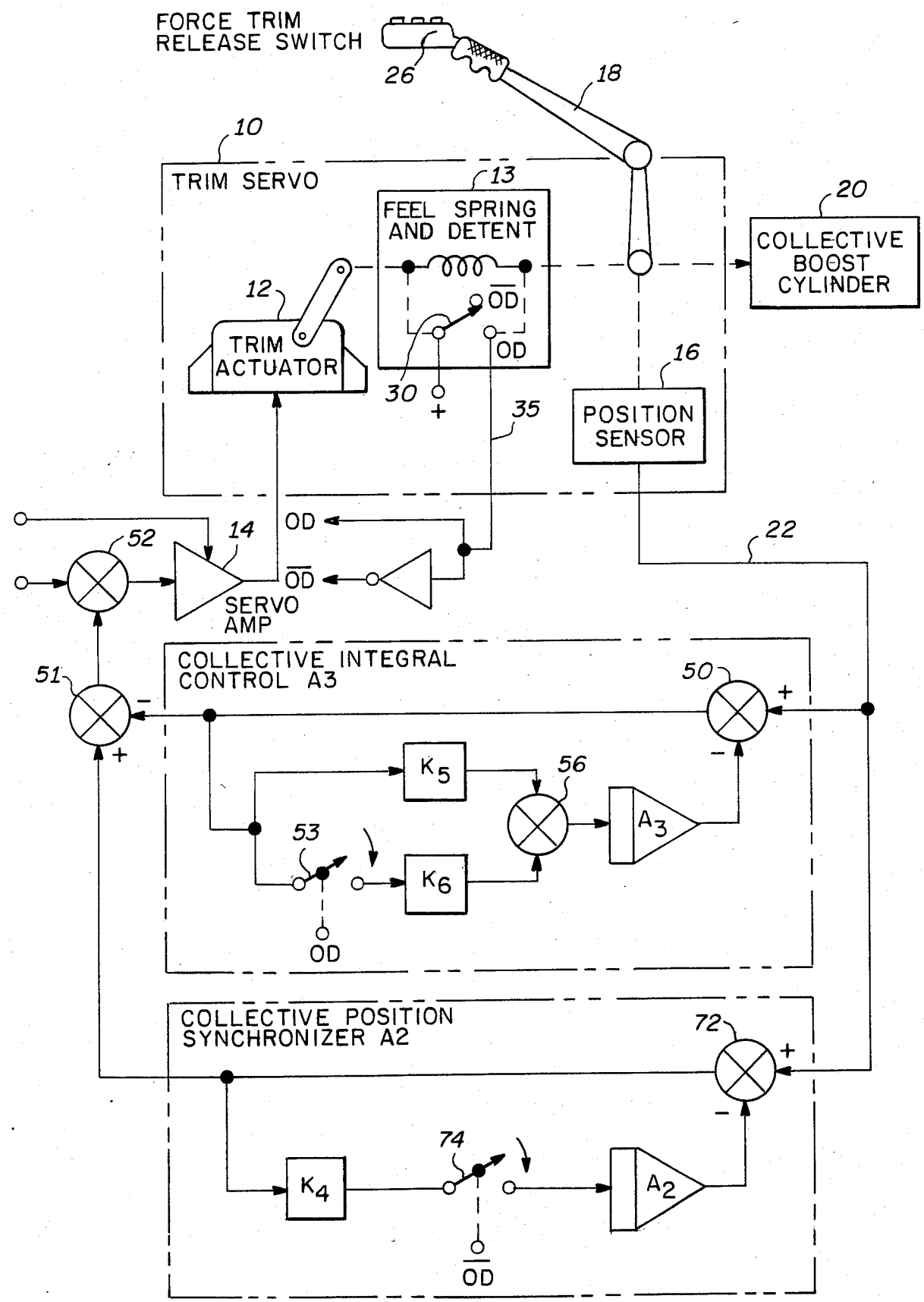

The collective axis of the autopilot illustrated in FIGS. 1A and 1B is interfaced to the aircraft collective power boost via a conventional trim servo 10, including trim actuator 12 and spring force gradient device 13 which may be of the type disclosed in the above U.S. Pat. No. 4,345,195. The trim actuator 12 is driven by a servo amplifier 14, typically of the phase width modulated variety as described in the present assignee's U.S. Pat. No. 3,848,833. A position pickoff or sensor 16, such as a potentiometer or synchro located between the collective lever 18 and the hydraulic boost cylinder 20, provides a feedback signal on line 22 which is used to close the servo amplifier 14 loop. As is conventional, the effect of the trim actuator force spring 13, with the servo amplifier 10 disabled, is to provide the pilot a feel force which is proportional to the displacement of the collective lever 18 from a trim (or unloaded) position. However, if a permanent change in trim is required, the pilot must depress the force trim release switch 26 which declutches the trim actuator control arm and allow it to be repositioned. Integral with the feel spring device 13 is a detent switch 30 which closes an electrical contact should a force be applied to the control lever 18 when the trim actuator 12 is in a clutched state. All of the foregoing is described in detail in the above '195 patent.

Autopilot equipment for providing an automatic radar altitude hold mode of operation of the collective axis of a helicopter is illustrated schematically in FIG. 1A. A radar altimeter 39 provides on lead 40 a signal proportional to the actual radar altitude of the aircraft. A radar altitude synchronizer A1 follows up on the lead 40 signal through gain K1 when the hold mode is not engaged and is clamped, through conventional hold engage logic (not shown) to provide an altitude error signal $h_e$ on lead 44. Altitude synchronizer A1 may also be controlled by a switch 45 associated with the collective stick out-of-detent logic so that the pilot can change altitude by moving the collective stick and upon its release, the new altitude will be maintained. The error signal $h_e$ is suitably scaled by gain K2 and supplied to summing junction 46. An altitude rate signal on lead 48 is conventionally generated by complementing vertical accelerations and actual radar altitude in complementary filter 47. This signal is summed at 46 with this altitude error signal to provide a conventional displacement and rate control signal $h_s$ on lead 49. Control signal 49 is suitably scaled by gain K3 and applied to trim servo amplifier 14.

The servo position feedback signal on lead 22 is also applied to the servo amplifier 14 through summing junctions 50, 51 and 52 to close the servo loop in conventional fashion. Additionally, a synchronizer loop A3 is also provided, its gain K5 being such as to provide a slow synchronization of the feedback signal whereby to slowly reduce to zero any steady state feedback signal from the position sensor 16. This then results in an integral control effect on the control error signal $h_s$ on lead 49. The follow-up synchronizer A3 is also controlled by a gain change switch 53 controlled by the collective stick out-of-detent logic signal to increase the speed at which the stick position signal is washed out.

The operation of the foregoing is conventional. The desired radar altitude is automatically held whenever the pilot is not exerting any force in the collective control stick 18. However, in a conventional system, if the pilot attempts to override the automatic system by moving the collective stick, the detent switch is actuated, the synchronizers A1 and A3 are placed in their synchronization mode and the servo amplifier 14 is inhibited. The pilot is commanding and controlling a change in altitude. When he reaches the new altitude, he releases pressure on the collective stick. The detent switch changes states reversing the above operation and the new altitude is held. However, when the pilot maneuvers into or out of the ground effect zone, the resulting change of lift on the aircraft will require a change in collective stick force trim in order to maintain the new altitude as will be described.

In accordance with the present invention, the detent switch 30 provides two logic discretes OD and $\overline{OD}$ from the switch signal in lead 35 for controlling the operation of the automatic ground effect compensation. Additionally, a further logic discrete is provided which depends on the aircraft vertical speed either up or down relative to a predetermined fixed low vertical speed and whether or not the collective stick is out-of-detent. The foregoing logic is provided by comparing the absolute value of actual vertical speed signal on lead 60 through an absolute value detector 61 with a fixed bias signal on lead 62 in comparator 63. If this absolute value of the actual vertical speed is greater than the predetermined fixed vertical speed, say 2 feet/second, the output of comparator on lead 64 goes high. The OD logic signal from lead 35 and the output of comparator 63 are applied to AND gate 66 so that if both signals are high, the AND gate output on lead 69 goes high. This condition indicates that the pilot is intentionally changing or commanding a vertical speed. Therefore, since a new condition is being commanded, the high logic signal on lead 69 is supplied to open switch 70 which removes power supply voltage from the servo amplifier 14 disabling it from the control of trim actuator 12, and permitting the synchronization operation described above. Also, in accordance with the present invention, a further synchronizer A2 responsive to the servo position feedback signal on lead 22 is provided and is referred to herein as the collective position synchronizer. Its function is also controlled by the collective stick $\overline{OD}$ logic as shown. Thus, whenever the collective stick is in detent ($\overline{OD}$), switch 74 is closed and the synchronizer follows up on the position feedback signal on lead 22. Its output is supplied to summing junction 51 through summing junction 72.

The operation of the automatic ground effect compensation system may now be described.

The radar altitude signal h on input line 40 is synchronized to integrator A1 through summing junction 42 whenever an out-of-detent condition is detected by logic OD. When the collective lever 18 is in detent, switch 45 opens and integrator A1 is placed in a hold state resulting in the altitude error signal $h_e$ on line 44. This signal is scaled by gain K2 and summed at summing junction 46 against the vertical speed signal h on line 48. The altitude displacement and rate sum $h_s$ is gain scaled by gain K3 and fed to the servo amplifier 14 through a detent condition switch 50 and summing junction 52. Switch 50 is closed whenever the collective stick detent switch is open, that is, zero or low signal on lead 35.

The servo position feedback signal on line 22 to the servo amplifier 14 through summing junction 52 is slowly synchronized through summing junction 50, gain K5, summing junction 56, and integrator A3. However, whenever an out-of-detent condition exists, gain K6 is switched by means of switch 53 and summing junction 56 ro provide a more rapid synchronization of the feedback signal under such conditions.

Figure 2:
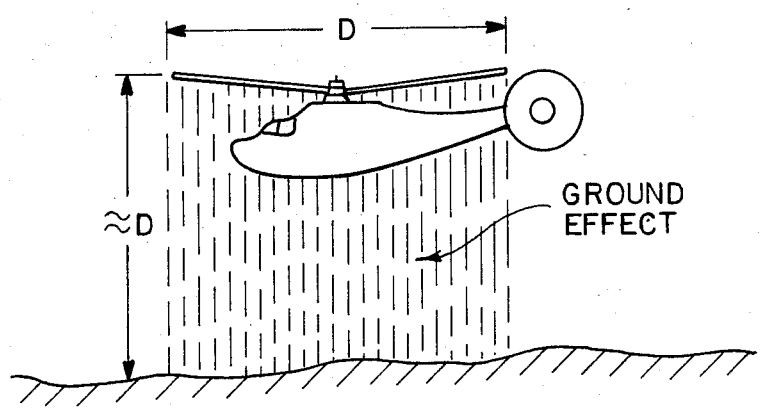
FIG. 2 is an illustration of a typical ground effect zone of a helicopter.
Figure 3:
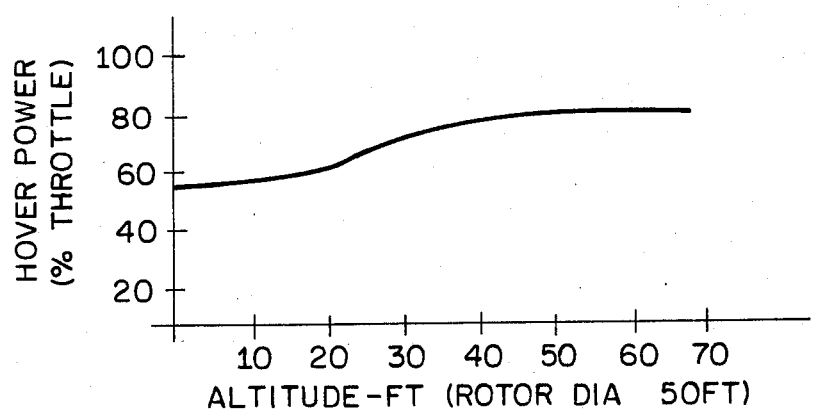
FIG. 3 is a graph of power required to hover in relationship to altitude in the ground effect zone.

The ground effect phenomenon is illustrated in FIG. 2. The ground (or of course water) below the helicopter presents a barrier to the downward airflow or downwash generated by the helicopter rotor. This creates a high pressure area below the helicopter and thereby increases the lift efficiency of the vehicle. The net result, as shown in FIG. 3, is that less power is required to hover the vehicle when it is operated in the ground effect zone while more power is required when transitioning out of the ground effect zone.

The transition into the ground effect zone can generally be detected by a lack of change of the vertical speed for a given collective lever 18 displacement. The vertical speed signal on lead 48 is passed through absolute value circuit or detector 61 and compared to the specified vertical speed reference, for example, 2 feet-per-second, in comparator 63. When the comparator output $|\dot{h}| > 2$ ft/sec on line 64 is high and the OD signal is high, AND gate output on lead 69 opens switch 70 to disable the servo amplifier 14. However, if the OD signal is present and there is no significant change in altitude or vertical speed, it is an indication that the aircraft is in the ground effect zone and the state of gate 66 changes thereby closing switch 70, and enabling the servo amplifier 14.

Now, assume that the pilot desires to maneuver the helicopter from a previously held altitude outside the ground effect zone to a new altitude to be held inside the ground effect zone. At the previously held altitude, the altitude error signal on lead 49 had positioned the collective stick, through the parallel trim actuator 12, undeflected feel spring 13, position follow-up sensor 16 and synchronizer A3. Since the feel spring was undeflected, an $\overline{OD}$ condition prevailed and the collective position synchronizer A2 followed up on the position sensor signal then required to satisfy the control loop. When the pilot overrode the controls at the original altitude to command and approach the new desired altitude, an OD condition existed which condition, in addition to disabling the servo amplifier 14 also opened switch 74 so that the integrator A2 is clamped and the feedback signal which previously satisfied the altitude hold loop is stored at its output. Now as the aircraft approaches the new altitude within the ground effect zone, he relaxes the pressure on the collective stick. However, although the vertical speed drops below the reference vertical speed and becomes essentially constant, the collective stick must remain deflected due to the ground effect to hold altitude. Therefore, the OD condition still exists but since the vertical speed has dropped below the reference vertical speed, the output of comparator 63 goes low closing the switch 70 and enabling the servo amplifier. Note that since the OD condition still exists, switch 50 remains open. With the energization of the servo amplifier, the previously established feedback signal on amplifier A2 now drives trim actuator 12 in a direction to reduce the spring force to zero and to establish the $\overline{OD}$ logic condition thereby re-establishing the altitude hold mode, but automatically compensated for the existing ground effect. It will be appreciated that the reverse of the foregoing operation will occur when the pilot maneuvers the aircraft from an altitude hold condition within the ground effect zone to one without the ground effect zone. Also, it will be appreciated that the above compensation occurs without the pilot knowing it; he simply commands any altitude in or out of the ground effect and the system will automatically stabilize the aircraft at the selected altitude with no altitude transients and no disruption of the force feel spring characteristics.

While the invention has been described in its preferred embodiment, it is to be understood that the words which have been used are words of description rather than of limitation and that changes may be made within the purview of the appended claims without departing from the true scope and spirit of the invention in its broader aspects.

We claim:

1. In an automatic altitude hold control system for an aircraft subject to ground effect, said control system including a manual controller for controlling the lift of the aircraft, a parallel servoactuator including a trim actuator and a controller force feel spring for coupling to said manual controller, an out-of-detent and in-detent spring deflection condition sensor for providing a signal indicative of a displacement of said manual controller, a controller position sensor for providing a signal corresponding to a position of said manual controller, and a servo amplifier responsive to altitude error for normally positioning said manual controller for reducing said altitude error to zero, apparatus responsive to a transition of said aircraft from an altitude outside an aircraft ground effect zone to an altitude within the aircraft ground effect zone and vice versa for automatically compensating said system for the resulting change in lift of the aircraft by driving said trim actuator in a direction which relieves any force being exerted by a human pilot in order to maintain the new commanded altitude, said apparatus comprising (a) a collective position synchronizer responsive to said controller position sensor, for supplying a signal corresponding to the controller position at a previously held altitude,
   (b) means for sensing the presence and absence of ground effect on said aircraft, and
   (c) means responsive to said ground effect sensor means for supplying said synchronizer signal corresponding to the controller position to said servo amplifier for driving said trim actuator to compensate said system.

2. A ground effect compensation apparatus as set forth in claim 1 wherein said controller position synchronizer comprises (a) switch means having one condition for causing said synchronizer to follow-up on said controller position sensor and another condition for clamping said synchronizer, and
   first logic means responsive to said spring deflection sensor for operating said switch means.

3. A ground effect compensation apparatus as set forth in claim 2 wherein said ground effect sensor means comprises (a) second logic means responsive to the vertical speed of the aircraft relative to a predetermined low vertical speed value and the condition of said spring deflection sensor.

4. A ground effect compensation apparatus as set forth in claim 3 wherein said second logic means provides a first condition signal upon said vertical speed exceeding said predetermined low value and said spring deflection sensor is in its out-of-detent condition, said apparatus further comprising (a) switch means coupled with said servo amplifier and responsive to said first condition signal of said second logic means for disabling its control of said trim actuator whereby said controller position synchronizer signal has no effect on said trim actuator.

5. A ground effect compensation apparatus as set forth in claim 4 wherein said second logic means provides a second condition signal upon said vertical speed being less than said predetermined low value and said spring deflection sensor is in its out-of-detent condition, and wherein said servo amplifier switch means is responsive to said second condition signal of said second logic means for enabling its control of said trim actuator, whereby said controller position synchronizer signal controls said trim actuator.

6. A ground effect compensation apparatus as set forth in claim 5 wherein said first logic means is responsive to said spring deflection sensor in its out-of-detent condition for placing said controller position synchronizer in its clamping condition of operation whereby said controller position synchronizer signal is supplied to said servo amplifier.

7. A ground effect compensation apparatus as set forth in claim 5 further comprising (a) switch means responsive to said spring deflection sensor in its out-of-detent condition for disengaging said altitude error from the input of said servo amplifier.

8. A ground effect compensation apparatus as set forth in claim 3 wherein said ground effect sensor means further comprises
   (a) means for sensing the magnitude of actual aircraft vertical speed and supplying a signal in accordance with an absolute value thereof,
   (b) means for providing a fixed bias signal corresponding to a predetermined low vertical speed, and
   (c) means for comparing said absolute value vertical speed signal and said bias signal and supplying an output representative of a first logical condition when said absolute value vertical speed signal exceeds said bias signal and of a second logical condition when said absolute value vertical speed signal is less than said bias signal.

9. A ground effect compensation apparatus as set forth in claim 8 wherein said second logic means comprises
   (a) logic gate means responsive to the output of said comparator means and to the condition of said spring deflection sensor.

10. A ground effect compensation apparatus as set forth in claim 9 wherein said gate means comprises
   (a) an AND gate responsive to said comparator output and said spring deflection sensor and for supplying a first output when said comparator output is of said first logical condition and said spring deflection sensor is in its out-of-detent condition and for supplying a second output when said comparator output is of said logical condition, said first and second outputs corresponding to first and second logical conditions.

* * * * *